C. P. Benoit.
Cutter-Holder.
N° 46,438.  Patented Feb. 21, 1865.
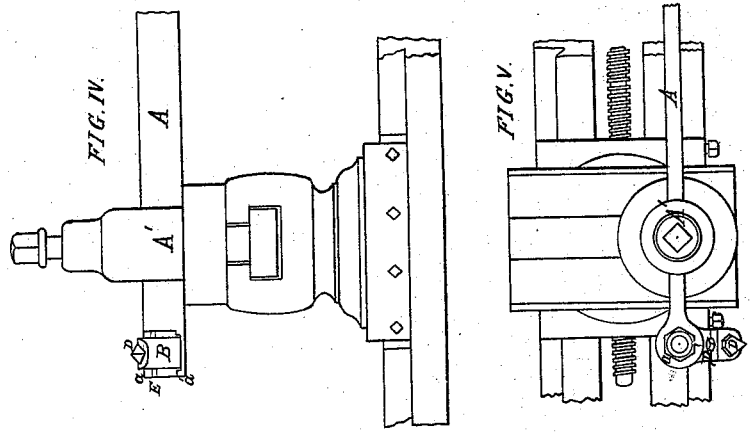
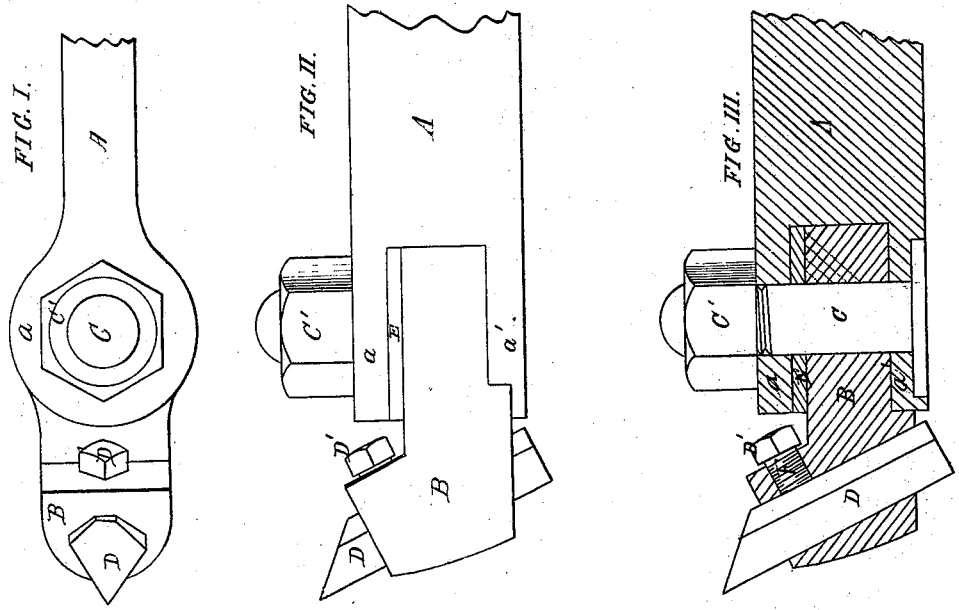
Witnesses.
Inventor.
Charles Petit Benoit

UNITED STATES PATENT OFFICE.

CHARLES PETIT BENOIT, OF DETROIT, MICHIGAN.

IMPROVED ADJUSTABLE TOOL-HOLDER.

Specification forming part of Letters Patent No. 46,438, dated February 21, 1865.

*To all whom it may concern:*

Be in known that I, CHARLES PETIT BENOIT, of Detroit, in the county of Wayne and State of Michigan, have invented a new and Improved Adjustable Tool-Holder; and I do hereby declare the following to be a full and exact description of the same, reference being had to the accompanying drawings, making part of this specification, in which—

Figure I is a plan of my improved toolholder. Fig. II is a side elevation thereof. Fig. III is a vertical longitudinal section of the same. Fig. IV is a side view on a smaller scale, showing the tool-holder turned to a position at right angles with the stock and the latter mounted upon the ordinary post. Fig. V is a plan of the parts shown in Fig. IV.

Similar letters of reference indicate corresponding parts in the several figures.

This invention relates to a tool holder of novel and simple construction, which may be adjusted in any desired position, and employed in lathes, planes, shapers, slotting-machines, &c., in the manner hereinafter described.

In order that others skilled in the art to which my invention appertains may be enabled to fully understand and use the same, I will proceed to describe its construction and operation.

A is the stock, mounted upon a post, A', which permits the stock to be advanced in any direction in customary manner. The stock is formed with jaws $a\ a$, to receive the circular part of the tool-holder B, and a friction washer or disk, E, the two latter being jointed or pivoted to the stock A by a screw-bolt, C, and the joints between the parts being tightened by the nut C'. The washers E, to prevent the turning of the holder B, when adjusted, are formed with radially grooved or roughened surfaces, as shown in Fig. III. In the holder B is an oblique socket for the reception of a tool or cutter, D, which may, in its transverse section be square, triangular, semicircular, round, of a suitable polygonal form, the shape offering the greatest frictional surface being preferable.

The adjustable tool holder and supporter above described may be either fastened in toolports or with straps in the same manner that common tools are fixed to the sliding-rest.

By unscrewing the nut C' on the bolt C the holder B may be turned with the tool D, so as to form any desired angle with the stock A, and by then screwing down the end C' the roughened surfaces of the washer E are made to form very tight joints or connections between the under sides of the jaws $a$ and the top of the circular portion of the holder B, so that when once adjusted, said holder cannot be turned by any force which may be applied to the tool.

By having several tools or cutters of suitable form adapted to the holder B a great variety of work can be done, and the peculiar manner of adjusting the holder renders unnecessary the employment of the large and expensive stock of tools which are required in connection with the holders hitherto in common use; hence the cost of dressing-tools is considerably reduced. The joint permits the same tool used for straight work to be placed at such an angle as will adapt it to turn pulleys and large objects which cannot well be reached with common tools.

By adjusting the holder B in a position at right angles with the stock A the tool may be used to cut grooves in objects moving parallel with the stock, and large enough on the interior to admit the holder with the cutter. The cutter may be secured and adjusted within the holder B by a set-screw, D.

I do not confine myself to any particular form of holder, but propose to vary the same as circumstances may dictate.

Having thus described my invention, the following is what I claim as new therein and desire to secure by Letters Patent:

1. The adjustable holder B, swiveled in the end of the stock A, so as to adapt the tool for various kinds of work, substantially as set forth.

2. In combination with a tool-holder constructed and mounted as above specified, the washer E, having grooved or roughened surfaces, and employed in connection with the nut C, for retaining the tool holder B in position, as explained.

CHARLES PETIT BENOIT.

Witnesses:
BERNARD H. TODT,
JOHN PETIT BENOIT.